(12) United States Patent
Chi et al.

(10) Patent No.: US 8,363,628 B2
(45) Date of Patent: Jan. 29, 2013

(54) WIRELESS NETWORK, ACCESS POINT, AND LOAD BALANCING METHOD THEREOF

(75) Inventors: Kuang-Hui Chi, Chiayi (TW); Yu-Ching Hsu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1205 days.

(21) Appl. No.: 12/190,583

(22) Filed: Aug. 12, 2008

(65) Prior Publication Data

US 2009/0303974 A1 Dec. 10, 2009

(30) Foreign Application Priority Data

Jun. 10, 2008 (TW) ................................ 97121571 A

(51) Int. Cl.
 *H04W 4/00* (2009.01)
(52) U.S. Cl. ........................................ 370/338; 455/453
(58) Field of Classification Search ........................ None
 See application file for complete search history.

(56) References Cited

U.S. PATENT DOCUMENTS

| 7,697,482 | B2 * | 4/2010 | Nakano | 370/331 |
|---|---|---|---|---|
| 2002/0010783 | A1 * | 1/2002 | Primak et al. | 709/228 |
| 2004/0039817 | A1 | 2/2004 | Lee et al. | |
| 2004/0063455 | A1 | 4/2004 | Eran et al. | |
| 2004/0156399 | A1 | 8/2004 | Eran | |
| 2005/0135316 | A1 * | 6/2005 | Cromer et al. | 370/338 |
| 2005/0213579 | A1 | 9/2005 | Iyer et al. | |
| 2007/0121635 | A1 | 5/2007 | Zhou et al. | |

OTHER PUBLICATIONS

"Office Action of Taiwan Counterpart Application", issued on Jan. 19, 2012, p. 1-p. 7, in which the listed reference was cited.

* cited by examiner

*Primary Examiner* — Yemane Mesfin
*Assistant Examiner* — Rhonda Murphy
(74) *Attorney, Agent, or Firm* — Jianq Chyun IP Office

(57) ABSTRACT

A wireless network, an access point (AP), and a load balancing method thereof are provided. Each AP of the wireless network obtains data related to bandwidth and radio frequency (RF) signal strength by interchanging messages with the other APs. Each AP performs a calculation according to the data to evaluate the advantage of potential bandwidth of the AP with respect to a user side mobile station (MS). By this advantage evaluation, one of the APs is selected to accept the association request of the MS. This method can be used to balance the load of the APs of the wireless network.

29 Claims, 4 Drawing Sheets

WIRELESS NETWORK, ACCESS POINT, AND LOAD BALANCING METHOD THEREOF

CROSS-REFERENCE TO RELATED APPLICATION

This application claims the priority benefit of Taiwan application serial no. 97121571, filed on Jun. 10, 2008. The entirety of the above-mentioned patent application is hereby incorporated by reference herein and made a part of specification.

BACKGROUND OF THE INVENTION

1. Field of the Invention

The present invention relates to an access point of a wireless network and a load balancing method thereof.

2. Description of Related Art

Because of the advantages of low costs and high bandwidth, wireless local area network (WLAN) which supports IEEE 802.11 standard is developing rapidly. Meanwhile, wireless interoperability for microwave access (WiMAX) based on IEEE 802.16 standard, which can be used to replace conventional wired network at a user's end, is also developing. As IEEE 802.11 and 802.16 standards become the primary technology of public wireless network, the importance of load balancing of the access points is increasing.

IEEE 802.11 and 802.16 standards do not define the detailed procedure of association between a wireless network and a user side mobile station (MS). In most systems, the association between a mobile station and an access point of a wireless network is determined by the received signal strength (RSS). However, such a method does not give consideration to how much bandwidth of the access point has been occupied and how many mobile stations the access point is serving.

A centralized load balancing method makes use of a local area network (LAN) and a switch to associate with each access point, as disclosed in US Patents 2004/0063455A1 and 2004/0156399A1. When an access point receives an uplink signal, such as a probe request frame or an association request frame, from a mobile station, a corresponding signal will be sent to a network interchanger. A manager node in the network interchanger will then receive and process the signals to decide which access point should accept the association of the mobile station.

SUMMARY OF THE INVENTION

The present invention provides a load balancing method of a wireless network, which selects a best-fit access point within the wireless network to accept an association request of a mobile station.

The exemplary embodiment consistent of the present invention provides an access point, which obtains association status and load status between access points by interchanging messages, so as to determine whether to accept an association request of a mobile station.

The exemplary embodiment consistent of the present invention provides a wireless network, in which access points may exchange relevant data, so as to determine whether to accept an association request of a mobile station or not.

The exemplary embodiment consistent of the present invention provides a load balancing method for an access point of a wireless network, which includes receiving a probe request frame from a mobile station, adding a first association record based on the probe request frame, receiving a second association record from each access point within the same local area network, and determining whether to accept an association of the mobile station based on the first and the second association records.

An exemplary embodiment consistent of the present invention provides an access point, which includes a calculation unit and a storage unit, for a wireless network. The calculation unit is used for receiving a probe request frame from a mobile station, adding a first association record based on the probe request frame, receiving a second association record from each access point within the same local area network, and determining whether to accept an association of the mobile station based on the first and the second association records. The storage unit is coupled with the calculation unit for storing the first and the second association records.

An exemplary embodiment consistent of the present invention provides a wireless network, which includes a plurality of access points having the aforesaid calculation unit and storage unit.

To make the above features and advantages of the present invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
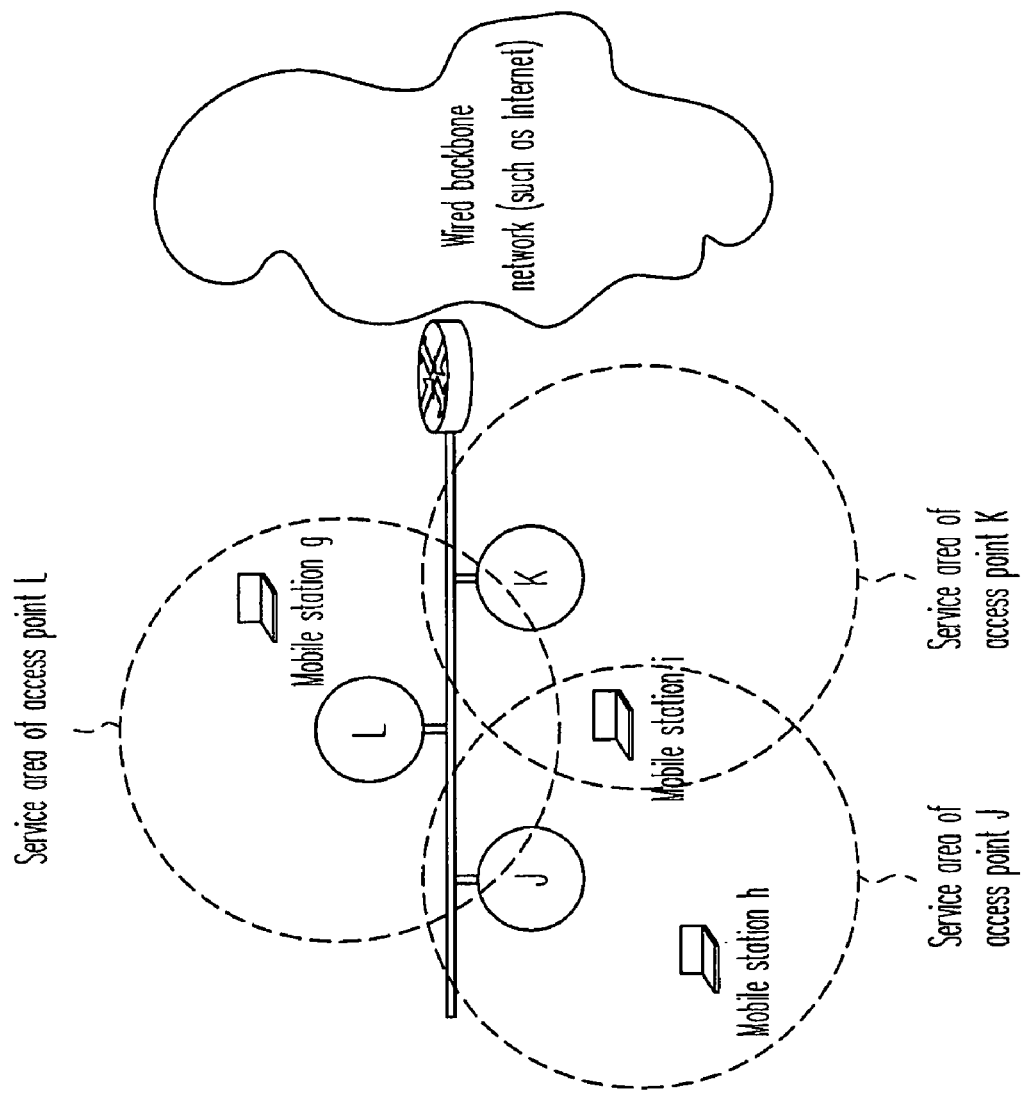
FIG. 1 is a diagram of a wireless network according to an embodiment of the present invention.

FIG. 1 is a diagram of a wireless network according to an embodiment of the present invention. The wireless network comprises three access points J, K, L and three mobile stations g, h, i. Herein, a service area of each access point, i.e. a range of a wireless signal, is indicated by a dotted line. The access points J, K, and L all perform the wireless network load balancing method of this embodiment. The access points J, K, and L are connected with one another by a wired backbone network (a local area network or the Internet).

A process flow of the wireless network load balancing method according to this embodiment is described as follows. Please refer to FIGS. 1, 2A, and 2B. Take the mobile station i as an example, the mobile station i sends a probe request frame when required to connect to the wireless network. The access points J and K within the range of the wireless signal receive the probe request frame and send corresponding probe response frames to the mobile station i (Step 1). In this embodiment, each access point has an association table stored therein. After sending the probe response frames, the access points J and K respectively add an association record to the association tables thereof (Step 2). Take the access point J as an example, the association table thereof is illustrated as the following Table 1.

TABLE 1

Association table of access point J

| Mobile station ID number | Access point ID number | Column of comparison | Column of time |
|---|---|---|---|
| i | J | −25 | 1000 |
| ... | ... | ... | ... |

In the association table, each row stores an association record. The association record comprises four columns. Herein, a column of mobile station ID number indicates an ID number of the mobile station sending the probe request frame. For instance, a layer two media access control address (MAC address) of a wireless network interface of the mobile station may be used as the ID number. A column of access point ID number indicates an ID number of the access point. For example, a media access control address of a wireless network interface of the access point may be used as the ID number. Referring to FIG. 1, g, h, i, J, K, and L all represent media access control addresses. The ID numbers in these two columns serve as an index of the association record. In this embodiment, a column of comparison indicates the signal strength of the mobile station i measured at the access point J, and the unit of the signal strength is dBm. For example, when receiving the probe request frame from the mobile station i, the access point J measures the RSS value of the probe request frame and put the RSS value into the column of comparison. A column of time indicates a valid time of the association record, and a unit of the valid time is millisecond (ms). In Step 2 of adding the association record, a unified predetermined value is put into the column of time. In this embodiment, the predetermined value is 1000 ms.

After adding the association record, each access point respectively sends its added association record to other access points and receives the added association records from other access points within the wired local area network (Step 3). Thereby, the association table of each access point stores the added association records of all the access points. In this embodiment, the access points J, K, and L are connected by a broadcast type wired local area network, such as an Ethernet. The added association records may be broadcasted in the aforesaid wired local area network by using a layer two frame, such as an Inter-Access Point Protocol (IAPP) frame which already exists in a general wireless network or an IEEE 802.2 type 1 logic link control frame. In the aforesaid two frames, columns are available for transmitting the newly-added association records.

The mobile station i measures the RSS of each access point and thereby determines a sequence. According to the sequence, association request frames are sequentially sent to each access point. An access point compares the column of comparison in the added association record thereof with the columns of comparison in the added association records from other access points when receiving the association request frame from the mobile station i. If the added association record of the access point has the largest value among all the columns of comparison in the association table, the access point replies an association response frame to the mobile station i to accept association (Step 4). On the contrary, if the added association record of the access point does not have the largest value among all the columns of comparison, the access point either replies the association response frame to deny association or sends no response so that the mobile station i may determine the denial of association after timeout.

In this embodiment, the column of comparison in the association record indicates the RSS value of the mobile station measured by the access point. The mobile station i has a RSS value of −25 dBm when measured by the access point J and has a RSS value of −34 dBm when measured by the access point K. Therefore, the access point J accepts the association and replies the association response frame to the mobile station i after receiving the association request frame from the mobile station i (Step 4); and the access point K denies the association. Generally speaking, larger RSS represents better signal quality and higher transmission rate. Hence, it is reasonable to have the access point with the largest RSS to accept the association request.

After the access point J accepts the association of the mobile station i, the column of time in the association record with an index (i,J) is set to another predetermined value, so as to indicate the association between the access point J and the mobile station i. In this embodiment, the predetermined value is infinite (Step 5). Then, the access point J sends a corresponding association notification frame to the access points L and K in the wired local area network (Step 6). After other access points receive the association notification frame, the columns of time in the association records with the index (i,J) are also set to be infinite (Step 7), so that the association tables of all the access points have the same content.

Each of the aforesaid access points regularly checks each association record in the association table thereof. If the column of time in the association record is not set to infinite, the column of time would be counted down. The access point would delete the association record when the column of time is counted down to zero.

In the above embodiment, the access point simply compares the RSS values of one mobile station measured by each access point to select one access point for accepting the association request. In other embodiments of the present invention, other indicators, such as a volume of the data to be transmitted by the mobile station, a remaining bandwidth of the access point, or a traffic load of the access point, may be used to replace the RSS value. The aforesaid indicators may also be put into a predetermined formula to calculate a value for comparison, so as to select one access point for accepting the association request. Several formulas are described as follows.

The first predetermined formula is $$\mu(r_{i,J})\left[\sum_{j \in S_J} 1/\mu(r_{j,J})\right]^{-1},$$

which calculates a comparison value called a preference. Herein, $r_{i,J}$ represents the RSS value of the mobile station i measured by the access point J, and $\mu$ represents a predetermined increasing function of a transmission rate (Mbps) to which the RSS value (dBm) corresponds. For example, for one access point of IEEE 802.11g, $\mu(-80)=18$ and $\mu(-78)=24$. $S_J$ represents an assembly of the mobile stations within a wireless signal range of the access point J. In other words, $$\sum_{j \in S_J} 1/\mu(r_{j,J})$$

represents the time required for respectively transmitting a bit from the access point J to each mobile station within the wireless signal range, which is also called a responsiveness of the access point J. The shorter the responsiveness is, the better the association quality is. Because the bandwidth available for the mobile station increases as the RSS value increases and decreases as the responsiveness becomes longer, the preference formula for the association of the mobile station i through the access point J is set to be $$\mu(r_{i,J})\left[\sum_{j \in S_J} 1/\mu(r_{j,J})\right]^{-1}.$$

Figure 2A:
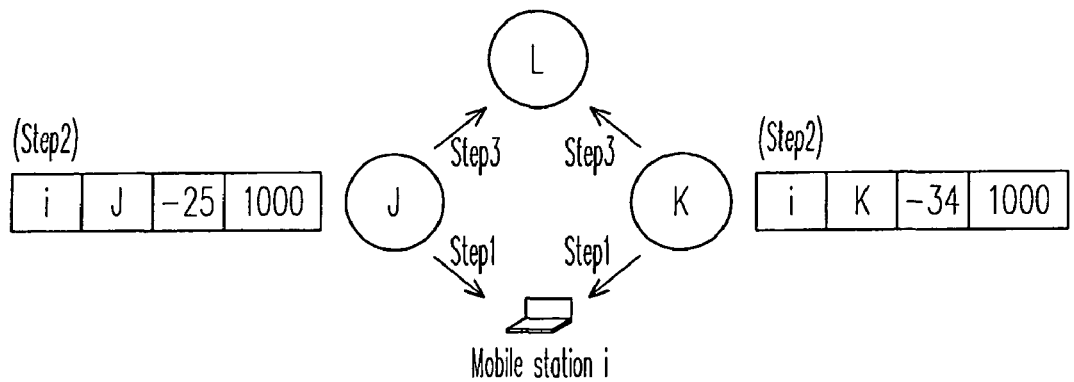
FIGS. 2A and 2B illustrate a process flow of a load balancing method according to an embodiment of the present invention.
Figure 2B:
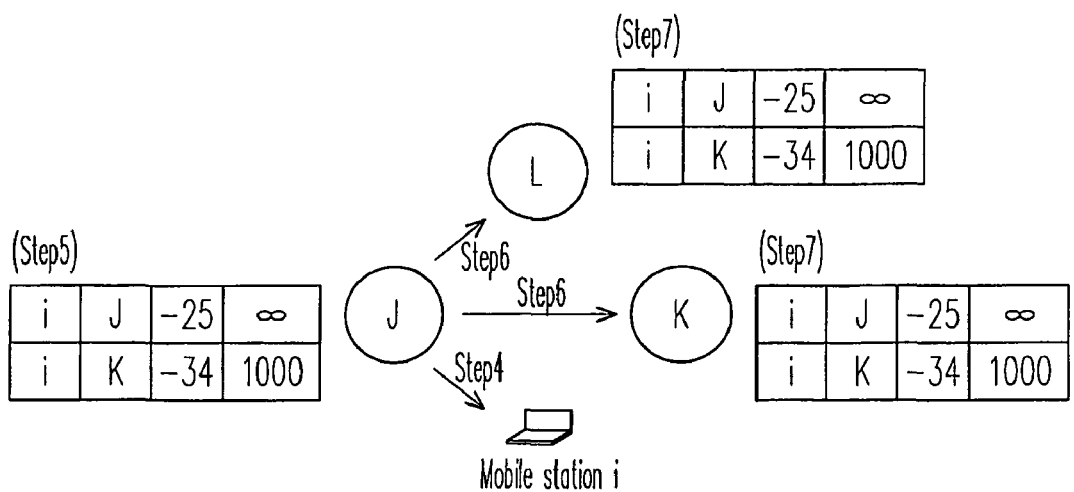

When the predetermined formula is adopted, referring to Step 4 of FIG. 2B, each access point calculates the comparison values of all the access points to the mobile station i by the formula. The access point having the largest comparison value then accepts the association request of the mobile station i, and other access points deny the association request.

The second predetermined formula is $\alpha \cdot \tilde{\mu}(r_{i,J})+(1-\alpha)\tilde{R}_J$, which is another expression of the preference, wherein $\alpha$ represents a predetermined parameter, $0 \leq \alpha \leq 1$, for controlling a weight-average ratio of $\tilde{\mu}(r_{i,J})$ and $\tilde{R}_J$. $\tilde{\mu}(r_{i,J})$ represents a ratio value obtained from the transmission rate $\mu(r_{i,J})$ of the access point J divided by a sum of the transmission rates of all the access points within the wireless signal range of the mobile station i. $\tilde{R}_J$ represents a ratio value obtained from a responsiveness inverse $$\left[\sum_{j \in S_J} 1/\mu(r_{j,J})\right]^{-1}$$

of the access point J divided by a sum of the responsiveness inverses of all the access points within the wireless signal range of the mobile station i.

The responsiveness $$\sum_{j \in S_J} 1/\mu(r_{j,J})$$

in the aforesaid two formulas may be further changed into $$\sum_{j \in S_J} \xi_j/\mu(r_{j,J}),$$

wherein $\xi_j$ represents the data volume to be transmitted by the mobile station j in the access point J. The data volume is, for example, a delivery queue length, and a unit thereof is byte. According to IEEE 802.11e standard, because data frame increases QoS control field, the access points can obtain the data about the queue length.

Some of the data required in the aforesaid formulas may be measured or calculated by one access point itself, but some need to be obtained from other access points. In such a situation, the access points within the same network may interchange the data required by using the aforesaid Inter-Access Point Protocol frame or the layer two frame.

In the above embodiments, each access point stores the RSS value of the mobile station in the column of comparison in the association record. The access point which receives the association request frame from the mobile station would calculate the comparison value of each access point, based on the column of comparison and other data, and then determine whether to accept the association request or not. In other embodiments of the present invention, when receiving the probe request frame from the mobile station, the access point may directly calculate the comparison value by the predetermined formula, store the comparison value in the column of comparison in the newly-added association record, and transmit the newly-added association record to other access points. Thereby, when receiving the association request frame from the mobile station, the access point may directly compare the data, based on the column of comparison, without wasting time on calculating the comparison values of each access point.

If one access point and a plurality of other access points all have the same largest comparison values when receiving the association request frame from the mobile station in Step 4, the access point may directly accept the association request or further compare the remaining bandwidths of the access points having the same largest comparison values. Upon further comparison, if the access point has the largest remaining bandwidth among all the access points having the largest comparison values, the access point accepts the association request of the mobile station. Otherwise, the access point denies the association request.

The remaining bandwidth of the access point is obtained by deducting a used bandwidth from the largest bandwidth of the access point. The used bandwidth refers to a sum of the bandwidths occupied by each mobile station for connecting to the wireless network through this access point. Each access point knows its largest bandwidth and is able to measure its own used bandwidth. The largest bandwidths and used bandwidths of other access points may be promulgated through the aforesaid Inter-Access Point Protocol frame or the layer two frame. Another method for acquiring the largest bandwidths and used bandwidths of other access points is to observe the common transmission medium of the broadcast type wired local area network (for example, a network line of the Ethernet), which connects each access point, and detect the message flows of other access points. In addition, the largest bandwidth of each access point may be directly stored in each access point through a manual configure.

Obviously, the message flows of other access points are the current used bandwidths. A method described as follows may be used to detect the largest bandwidth. IEEE 802.11 and IEEE 802.16 standards have different largest bandwidths. The largest bandwidths of these standards may be sequentially arranged from a small one to a large one. The smallest among the largest bandwidths is set to each access point first. If the used bandwidth being detected does not exceed the currently-set largest bandwidth, the used bandwidth remains the same. If the used bandwidth of one access point exceeds the currently-set largest bandwidth, the largest bandwidth of the access point is set to be the next largest bandwidth in the sequence, and the rest may be deduced by analogy.

In an embodiment of the present invention, the wireless network load balancing method as shown in FIGS. 2A and 2B may further comprise a start and stop judgment mechanism as follows. The wireless network load balancing method is performed if the used bandwidth of any access point within the wireless network is larger than a predetermined value, otherwise the wireless network load balancing method is stopped. The predetermined value may differ between access points. For instance, the predetermined value may be a predetermined proportion of the largest bandwidth of the access point, such as 80% of the largest bandwidth.

In an embodiment of the present invention, each access point may comprise a calculation unit and a storage unit coupled with each other. The calculation unit is used for performing the wireless network load balancing method in the above embodiments. The storage unit is used for storing association tables and other data, such as the data for the comparison value formulas, the observed message flows and relevant data of other access points, the manually configured largest bandwidths, and so forth.

FIGS. 3A, 3B, 4A, and 4B illustrate the simulated data according to an embodiment of the present invention. This embodiment compares the first predetermined formula with several conventional load balancing methods. Herein, a RSS-based method, as described in the first embodiment, is to compare the RSS value of the mobile station measured in each access point and to select the access point having the largest RSS value to accept the association request from the mobile station. A population-based method is to compare the number of mobile stations connecting to the wireless network through each access point, and select the access point serving fewest mobile stations to accept the association request. A utilization-based method is that the mobile station actively scans channel to detect the load of each access point and sends the association request frame to the access point having least load. This embodiment adopts the wireless network load balancing method as shown in FIGS. 2A and 2B, and uses the first predetermined formula $$\mu(r_{i,J})\left[\sum_{j\in S_J} 1/\mu(r_{j,J})\right]^{-1}.$$

Figure 3A:
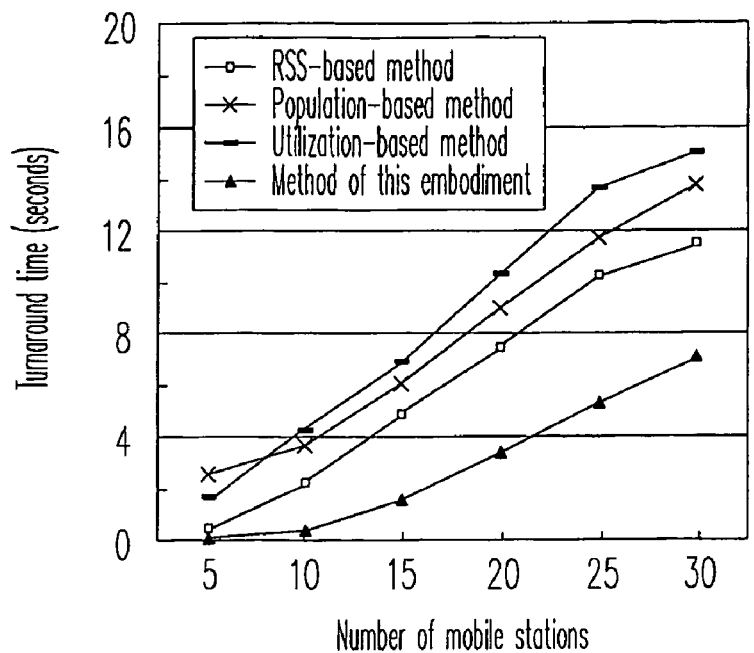
FIGS. 3A and 3B illustrate the comparison between turnaround times according to an embodiment of the present invention.
Figure 3B:
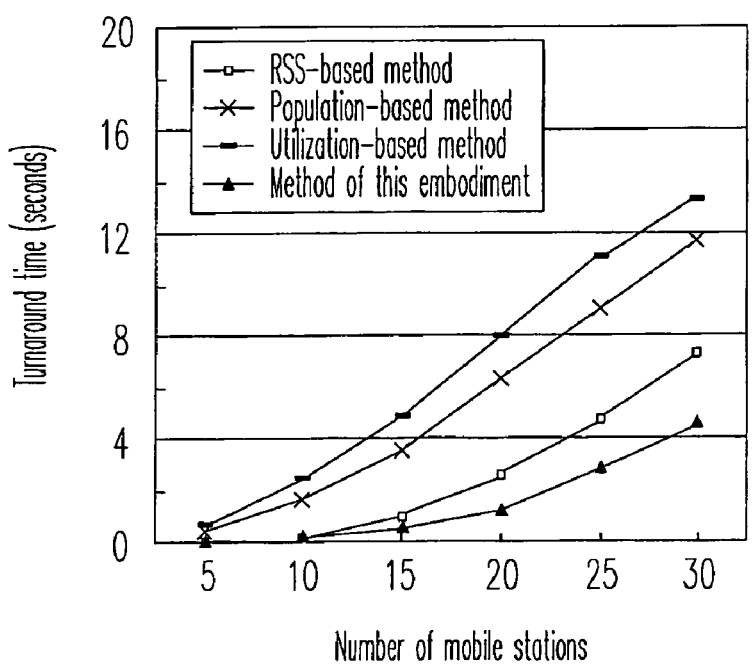
Figure 4A:
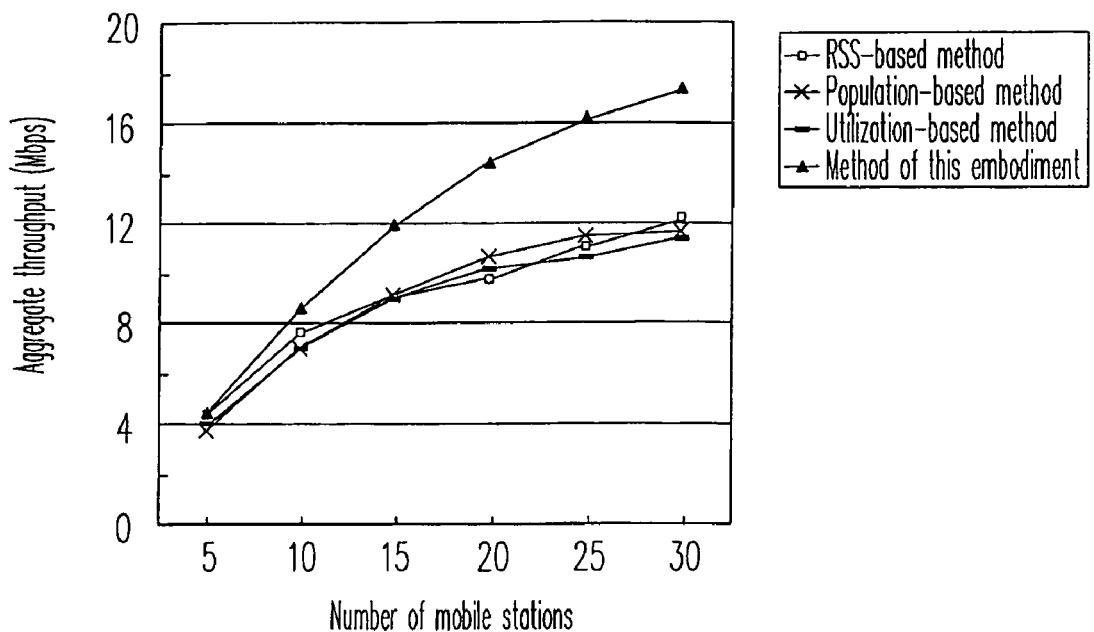
FIGS. 4A and 4B illustrate the comparison between aggregate throughputs according to an embodiment of the present invention.
Figure 4B:
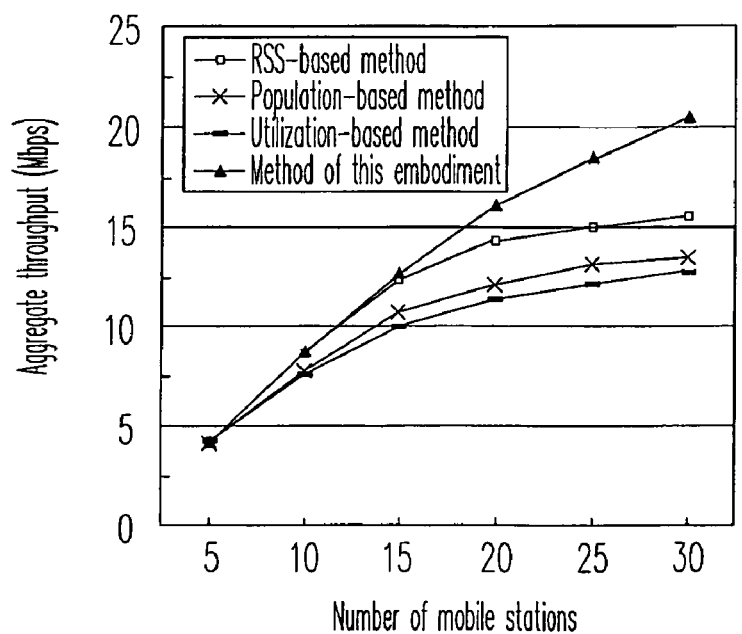

In this embodiment, the aforementioned four load balancing methods are compared based on the two combinations of access points in Table 2. FIG. 3A and FIG. 3B respectively illustrate the corresponding curves for turnaround times and the number of mobile stations of the four methods in Combination 1 and Combination 2. FIG. 4A and FIG. 4B respectively illustrate the corresponding curves for aggregate throughputs and the number of mobile stations of the four methods in Combination 1 and Combination 2. Based on FIGS. 3A through 4B, it is known that the load balancing method of this embodiment has the shortest turnaround time and the highest throughput, regardless of the number of the mobile stations. In the diagrams of FIGS. 3A, 3B, 4A, and 4B, the load balancing method of the present invention has the best result when compared with the conventional load balancing method.

TABLE 2

Simulated data of combinations of access points

| Number of combination | Combination of access points |
| --- | --- |
| Combination 1 | One IEEE 802.11b access point and two IEEE 802.11g access points |
| Combination 2 | IEEE 802.11g access points |

To conclude, the wireless network, the access point, and the load balancing method thereof according to the present invention make use of the existing Inter-Access Point Protocol frame and layer two frame for interchanging the required data and comparing, so as to select one best-fit access point to serve the association request from the mobile station. In the present invention, the calculation is respectively performed by each access point, which is a distributed type rather than a centralized type. Hence, an additional centralized management mechanism is not required. The present invention is an expansion according to the existing IEEE 802.11 or 802.16 standards, and is compatible to the IEEE 802.11 or 802.16 frames. Therefore, only the access points need to be slightly changed, and current mobile stations may remain the same.

Although the present invention has been disclosed by the above embodiments, they are not intended to limit the present invention. Persons with ordinary knowledge in the art may make some modifications and variations without departing from the spirit and scope of the present invention. Therefore, the protection range of the present invention falls in the appended claims.

What is claimed is:

1. A wireless network load balancing method for an access point of a wireless network, comprising:
 receiving a probe request frame from a mobile station;
 adding a first association record according to the probe request frame;
 receiving a second association record from each of other access points within a local area network of the access point; and
 determining whether to accept an association of the mobile station according to the first and the second association records, wherein the second association records are respectively the first association records of the other access points,
 wherein the added first association record comprises a column of comparison and the step of determining whether to accept the association of the mobile station based on the first and the second association records comprises:
 replying a first association response frame to the mobile station to accept the association if a comparison value of the added first association record is larger than the comparison value of each of the second association records, wherein the comparison value of the added first association record is directly obtained from the column of comparison in the added first association record or is calculated based on the column of comparison in the added first association record, and the comparison value of the second association record is directly obtained from the column of comparison in the second association record or is calculated based on the column of comparison in the second association record.

2. The wireless network load balancing method as claimed in claim 1, wherein the step of the access point receiving the probe request frame from the mobile station further comprises replying a probe response frame to the mobile station.

3. The wireless network load balancing method as claimed in claim 1, wherein the step of receiving the second association records from each of the other access points within the local area network of the access point further comprises:
 sending the added first association record to each of the other access points.

4. The wireless network load balancing method as claimed in claim 1, after the step of receiving the second association records from each of the other access points within the local area network of the access point, further comprising:
 receiving an association request frame from the mobile station.

5. The wireless network load balancing method as claimed in claim 1, wherein the column of comparison is selected from a group consisting of a signal strength of the mobile station at the access point, the comparison value calculated based on the signal strength, a volume of the data to be transmitted by the mobile station, a remaining bandwidth of the access point, and a network load of the access point.

6. The wireless network load balancing method as claimed in claim 5, wherein data required for calculating the column of comparison is obtained from messages sent by the other access points within the wireless network.

7. The wireless network load balancing method as claimed in claim 5, wherein the column of comparison is calculated based on signal strength of each mobile station within the local area network at the access point, or is calculated based on the signal strength of each said mobile station and the volume of the data to be transmitted by each said mobile station, or is calculated based on the signal strength of each said mobile station measured by each said access point within the local area network.

8. The wireless network load balancing method as claimed in claim 1, wherein the step of determining whether to accept the association of the mobile station based on the first and the second association records further comprises:
   if the comparison value of the added first association record is equal to the comparison values of a portion of the second association records and is larger than the comparison values of other second association records, comparing the remaining bandwidth of the access point with the remaining bandwidths of the access points corresponding to the portion of the second association records, so as to determine whether to accept the association of the mobile station, wherein the remaining bandwidths of the access points corresponding to the portion of the second association records are obtained from the messages sent by the access points corresponding to the portion or are obtained from an observation on a common transmission medium shared by the access points in the wireless network.

9. The wireless network load balancing method as claimed in claim 8, further comprising:
   setting the largest bandwidth of a said access point corresponding to the portion of the second association records as a first predetermined value;
   observing the used bandwidth of the said access point; and
   setting the largest bandwidth as a second predetermined value if the used bandwidth is larger than the first predetermined value;
   wherein the remaining bandwidth of the said access point is the largest bandwidth subtracting the used bandwidth.

10. The wireless network load balancing method as claimed in claim 1, wherein the step of determining whether to accept the association of the mobile station based on the first and the second association records further comprises:
   replying a second association response frame to the mobile station to deny the association if the comparison value of the added first association record is smaller than the comparison value of any of the second association records.

11. The wireless network load balancing method as claimed in claim 1, wherein the added first association record comprises a column of time, and the wireless network load balancing method further comprises:
   setting the column of time to a first predetermined value when adding the first association record;
   setting the column of time to a second predetermined value when accepting the association of the mobile station, and sending corresponding association notification frames to the other access points within the wireless network;
   setting the column of time in the corresponding second association record to the second predetermined value according to the association notification frames from the other access points within the wireless network;
   counting down the column of time in the added first association record or a said second association record if the column of time in the added first association record or the said second association record is not equal to the second predetermined value; and
   deleting the added first association record or the said second association record if the column of time in the added first association record or the said second association record is counted down to zero.

12. The wireless network load balancing method as claimed in claim 1, further comprising:
   performing the wireless network load balancing method if a used bandwidth of any access point within the wireless network is larger than a predetermined value, otherwise stopping the wireless network load balancing method.

13. The wireless network load balancing method as claimed in claim 12, wherein the predetermined value is a predetermined proportion of the largest bandwidth of the access point having the used bandwidth.

14. The wireless network load balancing method as claimed in claim 1, wherein the local area network to which the access point belongs is a wired local area network.

15. An access point for a wireless network, comprising:
   a calculation unit used for receiving a probe request frame from a mobile station, adding a first association record based on the probe request frame, receiving a second association record from each other access point within a local area network of the access point, and determining whether to accept an association of the mobile station based on the first and the second association records; and
   a storage unit coupled with the calculation unit for storing the first and the second association records, wherein the second association records are respectively the first association records of the other access points,
   wherein the added first association record comprises a column of comparison and the calculation unit replies a first association response frame to the mobile station to accept the association if a comparison value of the added first association record is larger than the comparison value of each of the second association records, wherein the comparison value of the added first association record is directly obtained from the column of comparison in the added first association record or is calculated by the calculation unit based on the column of comparison in the added first association record, and the comparison value of the second association record is directly obtained from the column of comparison in the second association record or is calculated by the calculation unit based on the column of comparison in the second association record.

16. The access point as claimed in claim 15, wherein the calculation unit is further used for replying a probe response frame corresponding to the probe request frame to the mobile station, sending the added first association record to the other access points, and receiving an association request frame of the mobile station.

17. The access point as claimed in claim 15, wherein the column of comparison is selected from a group consisting of a signal strength of the mobile station at the access point, the comparison value calculated based on the signal strength, a volume of the data to be transmitted by the mobile station, a remaining bandwidth of the access point, and a network load of the access point.

18. The access point as claimed in claim 17, wherein the calculation unit is further used to obtain data for calculating the column of comparison from messages sent by the other access points within the wireless network.

19. The access point as claimed in claim 17, wherein the column of comparison is calculated based on the signal strength of each mobile station within the local area network at the access point, or is calculated based on the signal strength of each said mobile station and the volume of the data to be transmitted of each said mobile station, or is calculated based on the signal strength of each said mobile station measured by each said access point within the local area network.

20. The access point as claimed in claim 15, wherein if the comparison value of the added first association record is equal to the comparison values of a portion of the second association records and larger than the comparison values of the other second association records, the calculation unit compares the remaining bandwidth of the access point with the remaining bandwidths of the access points corresponding to the portion of the second association records, so as to determine whether to accept the association of the mobile station, wherein the remaining bandwidths of the access points corresponding to the portion of the second association records are obtained from the messages sent by the access points corresponding to the portion or are obtained from an observation by the calculation unit on the common transmission medium shared by the access points in the wireless network.

21. The access point as claimed in claim 20, wherein the calculation unit is further used for setting the largest bandwidth of a said access point corresponding to the portion of the second association records as a first predetermined value, observing the used bandwidth of the said access point, and setting the largest bandwidth as a second predetermined value if the used bandwidth is larger than the first predetermined value, wherein the calculation unit deducts the used bandwidth from the largest bandwidth to obtain the remaining bandwidth of the said access point.

22. The access point as claimed in claim 15, wherein the calculation unit replies a second association response frame to the mobile station to deny the association if the comparison value of the added first association record is smaller than the comparison value of any of the second association records.

23. The access point as claimed in claim 15, wherein the added first association record comprises a column of time, and the calculation unit is further used for setting the column of time to a first predetermined value when adding the first association record, setting the column of time to a second predetermined value and sending corresponding association notification frame to the other access points in the wireless network when accepting the association of the mobile station, setting the columns of time in the corresponding second association records to the second predetermined value based on the association notification frames from the other access points, counting down the column of time in the added first association record or a said second association record if the column of time is not equal to the second predetermined value, and deleting the added first association record or the said second association record if the column of time in the added first association record or the said second association record is counted down to zero.

24. The access point as claimed in claim 15, wherein the local area network to which the access point belongs is a wired local area network.

25. A wireless network, comprising a plurality of access points, each of the access points comprising:
a calculation unit used for receiving a probe request frame from a mobile station, adding a first association record based on the probe request frame, receiving a second association record from each other access point within a local area network of the access point, and determining whether to accept an association of the mobile station based on the first and the second association records; and a storage unit coupled with the calculation unit for storing the first and the second association records, wherein the second association records received by each said access point are respectively the first association records of the other access points,
wherein the added first association record comprises a column of comparison and the calculation unit replies a first association response frame to the mobile station to accept the association if a comparison value of the added first association record is larger than the comparison value of each of the second association records, wherein the comparison value of the added first association record is directly obtained from the column of comparison in the added first association record or is calculated by the calculation unit based on the column of comparison in the added first association record, and the comparison value of the second association record is directly obtained from the column of comparison in the second association record or is calculated by the calculation unit based on the column of comparison in the second association record.

26. The wireless network as claimed in claim 25, wherein the local area network to which the access point belongs is a wired local area network.

27. A wireless network load balancing method for an access point of a wireless network, comprising:
receiving a probe request frame from a mobile station;
adding a first association record according to the probe request frame, wherein the added first association record comprises a column of time;
receiving a second association record from each of other access points within a local area network of the access point;
determining whether to accept an association of the mobile station according to the first and the second association records, wherein the second association records are respectively the first association records of the other access points;
setting the column of time to a first predetermined value when adding the first association record;
setting the column of time to a second predetermined value when accepting the association of the mobile station, and sending corresponding association notification frames to the other access points within the wireless network;
setting the column of time in the corresponding second association record to the second predetermined value according to the association notification frames from the other access points within the wireless network;
counting down the column of time in the added first association record or a said second association record if the column of time in the added first association record or the said second association record is not equal to the second predetermined value; and
deleting the added first association record or the said second association record if the column of time in the added first association record or the said second association record is counted down to zero.

28. An access point for a wireless network, comprising:
a calculation unit used for receiving a probe request frame from a mobile station, adding a first association record based on the probe request frame, receiving a second association record from each other access point within a local area network of the access point, and determining whether to accept an association of the mobile station based on the first and the second association records; and a storage unit coupled with the calculation unit for storing the first and the second association records, wherein the second association records are respectively the first association records of the other access points, wherein the added first association record comprises a column of time, and the calculation unit is further used for setting the column of time to a first predetermined value when adding the first association record, setting the column of time to a second predetermined value and sending corresponding association notification frame to the other access points in the wireless network when accepting the association of the mobile station, setting the columns of time in the corresponding second association records to the second predetermined value based on the association notification frames from the other access points, counting down the column of time in the added first association record or a said second association record if the column of time is not equal to the second predetermined value, and deleting the added first association record or the said second association record if the column of time in the added first association record or the said second association record is counted down to zero.

29. A wireless network, comprising a plurality of access points, each of the access points comprising:

a calculation unit used for receiving a probe request frame from a mobile station, adding a first association record based on the probe request frame, receiving a second association record from each other access point within a local area network of the access point, and determining whether to accept an association of the mobile station based on the first and the second association records; and a storage unit coupled with the calculation unit for storing the first and the second association records, wherein the second association records received by each said access point are respectively the first association records of the other access points, wherein the added first association record comprises a column of time, and the calculation unit is further used for setting the column of time to a first predetermined value when adding the first association record, setting the column of time to a second predetermined value and sending corresponding association notification frame to the other access points in the wireless network when accepting the association of the mobile station, setting the columns of time in the corresponding second association records to the second predetermined value based on the association notification frames from the other access points, counting down the column of time in the added first association record or a said second association record if the column of time is not equal to the second predetermined value, and deleting the added first association record or the said second association record if the column of time in the added first association record or the said second association record is counted down to zero.

* * * * *